J. KOONS.
Grain-Separators.

No. 143,081. Patented September 23, 1873.

Witnesses:
A. Bennersdorf
C. Sedgwick

Inventor:
J. Koons
Per
Attorneys.

2 Sheets--Sheet 2.
J. KOONS.
Grain-Separators.
No. 143,081. Patented September 23, 1873.
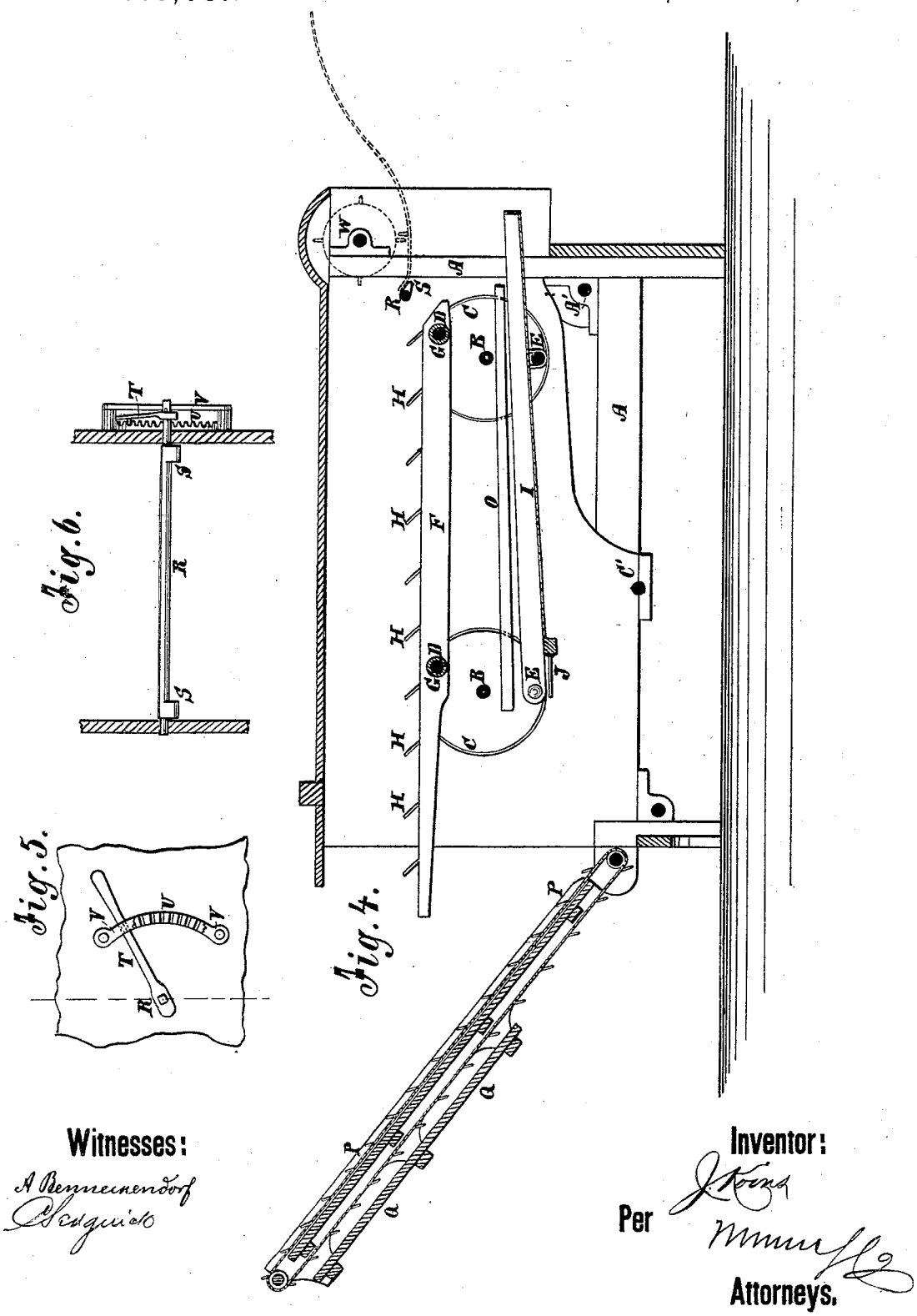
Witnesses:
Inventor:

UNITED STATES PATENT OFFICE.

JOSEPH KOONS, OF NEW AUBURN, MINNESOTA.

IMPROVEMENT IN GRAIN-SEPARATORS.

Specification forming part of Letters Patent No. 143,081, dated September 23, 1873; application filed June 14, 1873.

*To all whom it may concern:*

Figure 1:
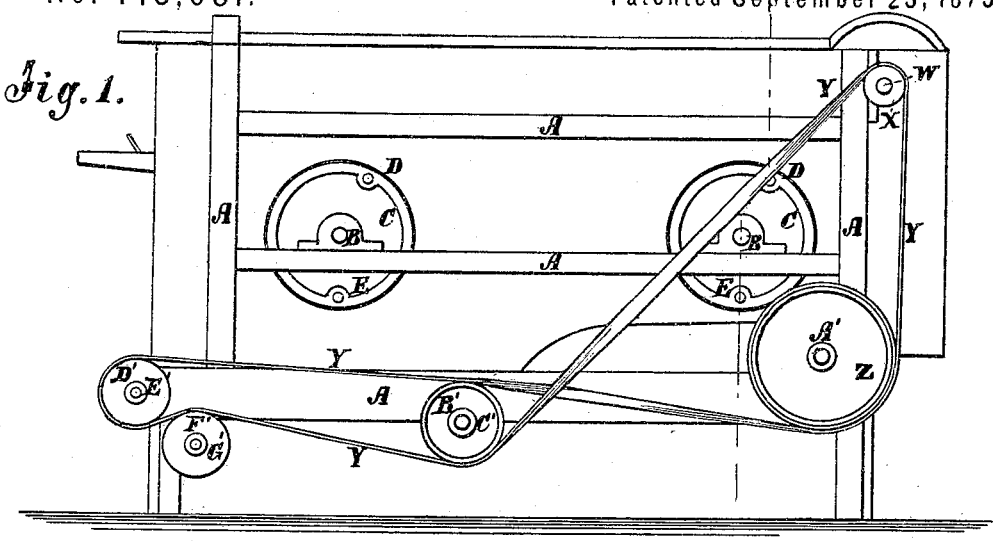
Figure 2:
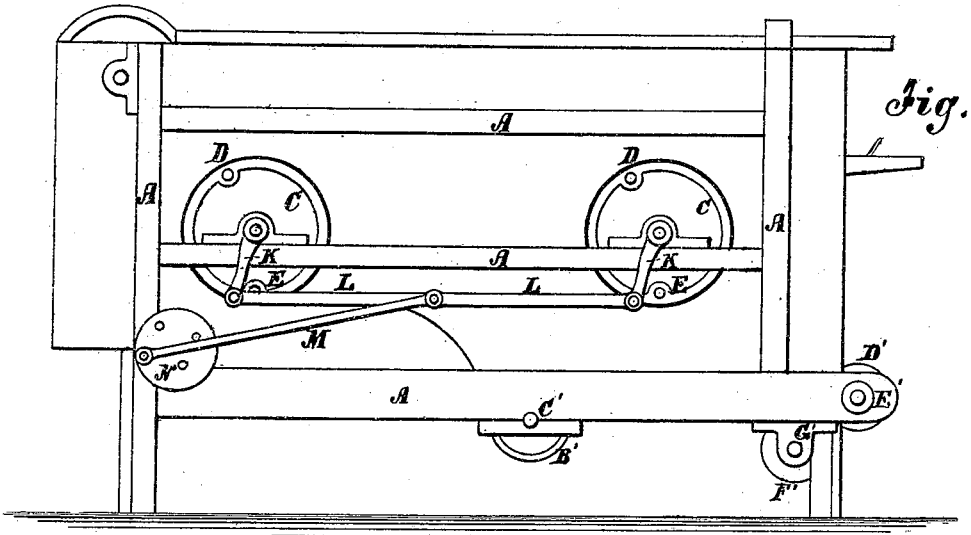
Figure 3:
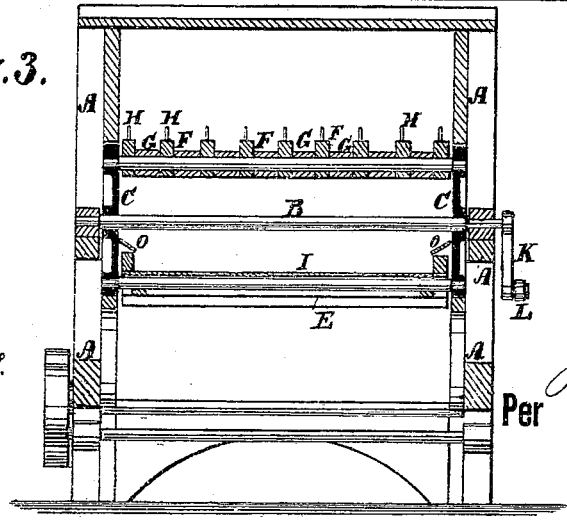

Be it known that I, JOSEPH KOONS, of New Auburn, in the county of Sibley and State of Minnesota, have invented a new and useful Improvement in Oscillating Grain-Separator, of which the following is a specification:

Figure 1, Sheet 1, is a view of one side of my improved separator, showing the arrangement of the belt and pulleys for driving the various parts. Fig. 2, Sheet 1, is a view of the other side of the same, showing the arrangement for operating the separating-rack. Fig. 3, Sheet 1, is a vertical cross-section of the same taken through the line $x\ x$, Fig. 1. Fig. 4, Sheet 2, is a vertical longitudinal section of the same. Figs. 5 and 6, Sheet 2, are detail views of the device for raising and lowering the concave of the thrasher.

Similar letters of reference indicate corresponding parts.

My invention has for its object to furnish an improved grain-separator, which shall be so constructed as to thoroughly separate the grain from the straw as they come from the thrasher, clean the grain and remove it, carry the straw out of the machine and deposit it upon the stack. The invention consists in the improvement of grain-separators, as hereinafter described, and pointed out in the claim.

A is the frame of the machine, which is made rectangular in form, and is incased upon its top and sides. The frame A is from twelve to fourteen feet long, about four and a half feet high, and from three to four and a half feet wide. B are two shafts, the journals of which revolve in bearings attached to a side bar of the frame A. To each shaft B, just at the inner side of its bearings, are attached two wheels, C, about twelve inches in diameter, which wheels work in circular spaces in the casing of the machine, so that the straw and grain cannot escape. The wheels C of each shaft B are connected near the rims, at their upper and lower parts, by two rods, D E. The radiuses of the points of attachment of the rods D E to each of the wheels C form an angle with each other of from one hundred and sixty to one hundred and eighty degrees. The upper rods D pass through the slats F that form the separating-rack, and which are kept at the proper distance apart by tubular washers G placed upon the rods D and interposed between the said slats F. The upper edges of the slats F are provided with teeth or fingers, H, inclining forward, so that as the rack moves upward and forward it may carry the straw with it, and may slide beneath the straw as it moves downward and rearward. By this construction, as the shafts B are rocked, the rack F G H receives the vertical and horizontal movements necessary to properly separate the grain from the straw and carry the straw forward. To the lower rods E is attached the conductor I, which receives the grain from the rack and conducts it to the shoe or sieves. The conductor I may be horizontal; but I prefer to incline it a little forward, so as to cause the grain to pass along it more readily. As the conductor I is required to be a little shorter than the rack F G H, the middle part of the forward rod E is cut away, its ends becoming pins, and being attached to the forward ends of the side bars of said conductor I. To the forward end of the conductor I are attached fingers J to break up the sheet of grain as it falls to the shoe or sieves. The conductor I has the same vertical and horizontal movement as the rack F G H. To one of the ends of each of the shafts B is attached a crank, K, about five or six inches in length. The two cranks K are connected by a bar or rod, L, so that they may always move together and in the same direction. To the center of the rod or bar L is pivoted one end of the bar or rod M, the other end of which is pivoted to a crank-pin attached to the wheel N, several holes being formed in the said wheel at different distances from its center, so that more or less motion may be given to the rack and conductor, as may be required. By making the connecting-bar M adjustable in length the ratio between the horizontal and vertical movements of the rack and conductor may be regulated at will. This adjustment enables the forward movement of the straw to be accelerated or retarded, as required. A rack having the movement herein described may be used, in connection with an endless canvas apron, as a conductor, and made to elevate the straw from three to four inches per foot. This construction would make the machine more convenient, as it would enable the thrashing-cylinder to be placed in a lower and the fan-mill in a higher position. O are inclined shelves or aprons attached to the sides of the machine, between the rack F G H and the conductor I, to prevent any grain from falling between said sides and the side edges of the said conductor. From the rack F G H the straw passes to the stacker P, up which it is carried and deposited upon the stack by an endless-belt carrier. To the under side of the frame of the stacker P is attached a second bottom, Q, at such a distance from the true bottom of said stacker that there may be a space between said bottoms to allow the endless belt to pass through. The bottom Q may be attached to projections formed upon the frame of the stacker, or to studs, arms, or bars attached to said frame, should extend from the upper end of the stacker about two-thirds its length, and is designed to prevent the straw carried up by the stacker from being again carried down by the belt, which is a great annoyance with stackers constructed in the ordinary way. R is a shaft working in bearings in the frame of the machine in such a position as to be directly beneath the concave of the thrasher. Upon the shaft R are formed, or to it are attached, cams S, two or more, which rest against the under side of the said concave, so that it may be raised and lowered by rocking the said shaft. To one end of the shaft R is attached the end of a spring-lever, T, which passes across the curved rack-bar U, by the teeth of which it is held securely in any position into which it may be adjusted. The lever T is kept in place by a keeper, V, between which and the rack-bar U it moves when being adjusted. W represents the cylinder-shaft of the thrasher, to which power is applied in the ordinary manner. To the end of the shaft W is attached a pulley, X, around which passes the belt Y. From the pulley X the belt Y passes down to the pulley Z attached to the shaft A, which works in bearings attached to the lower part of the frame A, and to the other end of which is attached the crank-wheel N that drives the separating-rack and the conductor. From the pulley Z the belt Y passes over the pulley B' attached to the fan-shaft C' that revolves in bearings in the lower part of the frame A. From the pulley B' the belt Y passes over and around the pulley D' attached to the stacker-shaft E', which revolves in bearings in the forward part of the frame A. From the pulley D' the belt Y passes over the pulley F' attached to the shaft G', which drives the elevator. From the pulley F' the belt Y passes under the pulley B' of the fan-shaft C', and thence back to the pulley X of the thrasher-cylinder.

By this arrangement all the parts of the machine, except the rack, conveyer, and fan-mill shoe, are driven by a single belt. The fan-mill shoe may be driven from the other end of the fan-shaft C' or of the grain-elevator shaft G'.

Having thus described my invention, I claim as new and desire to secure by Letters Patent—

The shafts B, wheels C, upper rods D, lower rods E, or equivalent pins, cranks K, connecting-bars L M, and wheel N, provided with an adjustable crank-pin, in combination with each other and with the rack F G H and the conductor I, substantially as herein shown and described.

JOSEPH KOONS.

Witnesses:
G. K. GILBERT,
JAMES C. EDSON.